Dec. 26, 1939.   C. B. SPANGENBERG   2,184,703
TEMPERATURE CONTROL SYSTEM
Filed Feb. 13, 1936
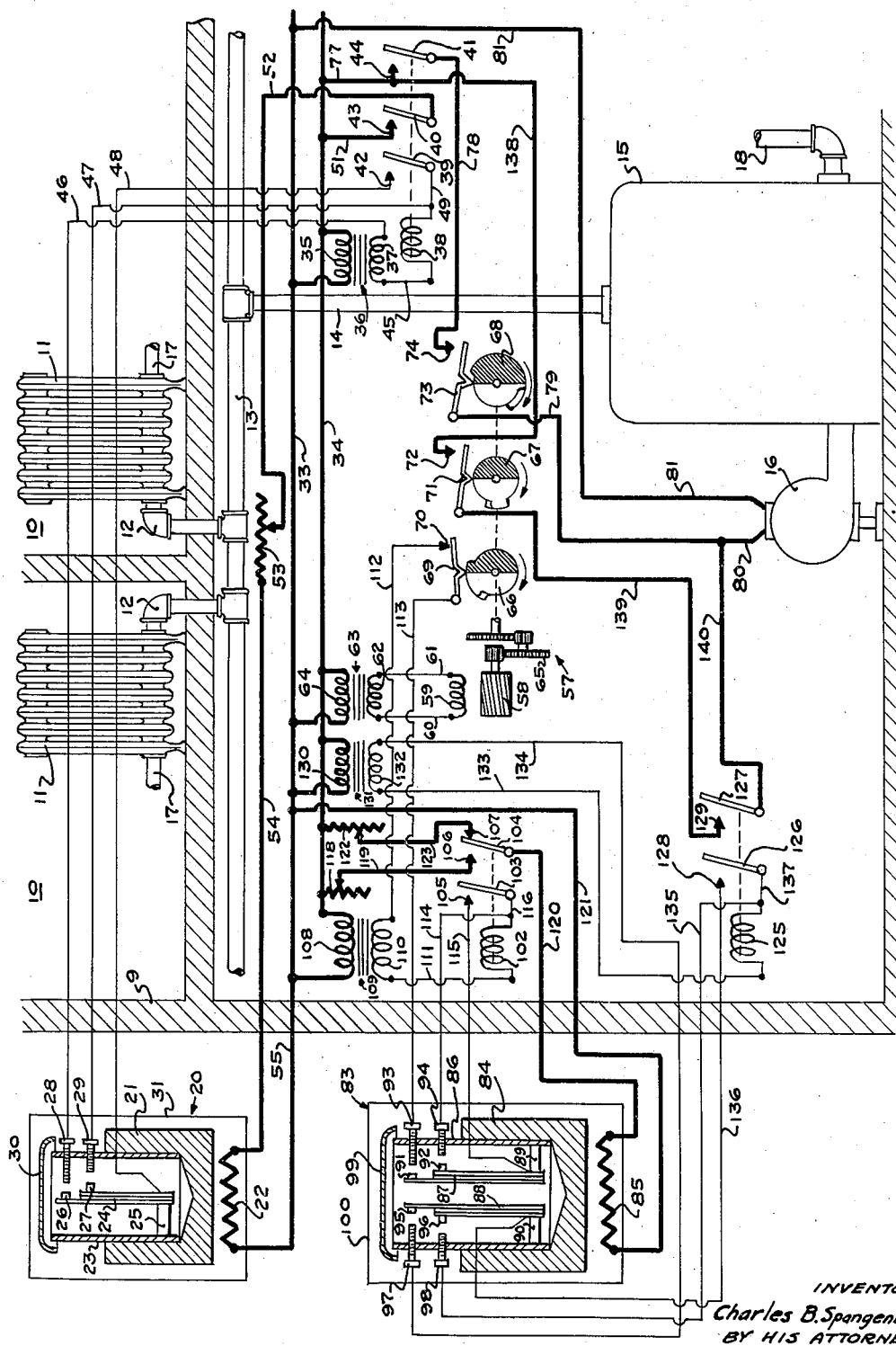
INVENTOR
*Charles B. Spangenberg*
BY HIS ATTORNEY
*George H. Fisher*

Patented Dec. 26, 1939

2,184,703

UNITED STATES PATENT OFFICE 2,184,703

TEMPERATURE CONTROL SYSTEM

Charles B. Spangenberg, Minneapolis, Minn., assignor to Minneapolis-Honeywell Regulator Company, Minneapolis, Minn., a corporation of Delaware Application February 13, 1936, Serial No. 63,726

11 Claims. (Cl. 236—46)

This invention relates to temperature control systems for building heating systems, and more particularly as applied to building heating systems that are shut down during the night.

When a building heating system is shut down at night the temperature of the building decreases from normal. In the morning when the building heating system is again placed in operation the building temperature is restored to normal, but on cold mornings it takes a longer time to restore the temperature of the building to normal than on milder mornings. Therefore, if the building heating means is started at a given time each morning the temperature of the building will be restored to the normal value later on severe mornings than on mild mornings.

It is the prime object of this invention to provide a temperature control system wherein the building temperature is restored to normal at a given time each morning regardless of outdoor atmospheric conditions.

More specifically, it is an object of this invention to provide a means for starting the building heating means earlier when the outdoor atmospheric conditions are severe and later when the outdoor atmospheric conditions are mild, in order to restore the building temperature to normal at a given time each morning.

In carrying out my invention I utilize a mass located outside of the building, which is maintained at a given temperature greater than the ambient temperature. At a given time in the morning the mass is allowed to cool and the rate of cooling of the mass is determined by the severity of the outdoor atmospheric conditions. On severe mornings the mass will cool much more rapidly than on mild mornings, and this rate of cooling is not only determined by the outdoor temperature but by the combined effects of the outdoor temperature, wind and solar radiation. A thermostatic device responsive to the temperature of the mass is operable when the temperature of the mass has cooled to a given value to place the building heating means in operation. Therefore, it is seen that on severe mornings the building heating means is placed in operation earlier than on mild mornings. By proper adjustment of the rate of cooling of the mass the building temperature may therefore be restored to normal at a given subsequent time each morning regardless of the outdoor atmospheric conditions, including temperature, wind and solar radiation. The structure and mode of operation outlined herein also form objects of this invention.

I have shown my invention as applied to a temperature control system of the type shown and described in application Serial No. 512,887 filed by Daniel G. Taylor on February 2, 1931 and which has matured into Patent No. 2,065,835 issued December 29, 1936. The system disclosed in this Taylor application comprises an outdoor controller responsive to outdoor atmospheric conditions, including temperature, wind and solar radiation, for controlling the temperature within the building. Heating means are provided in the building for supplying heat to the building, and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outdoor controller. Due to the proportional relationship of the heating means with the heat losses of the building and the outdoor controller a definite temperature relation is maintained within the building and the outdoor controller, so that by responding to the temperature of the outdoor controller the thermostatic device maintains a constant or normal temperature within the building.

Such a system gives accurate results when the system is maintained in operation for twenty-four hours a day. However, it is often desirable to shut down the heating system during the night to lower the temperature within the building to conserve on fuel costs, but due to the fundamental theory of operation the system of the Taylor application cannot supply sufficient heat to the building in the morning after a night shutdown to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate a system of the type disclosed in the above referred to Taylor application where it is desired to have a night shutdown, it is necessary that some independent means be provided to raise the temperature in the building to normal after a night shutdown.

Therefore, it is another object of this invention to provide a morning pickup control for this type of heating system, whereby the building temperature is brought up to normal so that the temperature of the building may be maintained at normal by the outdoor controller.

In carrying out this portion of my invention I provide means for continuously operating the building heating means independent of the outdoor controller to restore the building temperature to normal, and the period of time during which the building heating means is continuously operated is determined by the above referred to variable morning pickup outdoor controller. In other words, the morning pickup controller is allowed to cool at a given time in the morning and when the morning pickup controller has cooled to a predetermined value the building heating means is placed in continuous operation until a subsequent time in the morning when the building heating means is placed under the control of the outdoor controller of the above referred to Taylor application. Therefore, the beginning of the period of continuous operation of the building heating means will vary in accordance with outdoor atmospheric conditions so that the building temperature will be restored to normal at a given time each morning regardless of outdoor atmospheric conditions, and when the building temperature is so restored the control of the building heating means is transferred to the outdoor controller of the Taylor application. The structure and mode of operation of this portion of my invention also form objects of my invention.

Other objects and advantages will become apparent to those skilled in the art upon reference to the accompanying specification, claims and drawing.

The single sheet of the drawing illustrates the preferred form of my invention.

Referring now to the drawing, I have shown a building having a side wall 9 and a plurality of spaces 10 to be heated. Located in each space 10 is a heat exchanger or radiator 11 which receives a supply of heating fluid, such as hot water, through risers 12 connected to a header 13 which in turn is connected by a pipe 14 to a boiler 15. The boiler 15 is heated by means of an oil burner 16 having the usual safety controls, not shown. Water is returned from the radiators 11 by means of pipes 17 to a header 18 connected into the boiler 15. By reason of these piping connections hot water is circulated from the boiler 15 through the radiators 11 to cause heating of the spaces 10.

An outdoor controller located outside of the building is generally designated at 20. This outdoor controller 20 may comprise a mass in the form of a metallic block 21 which may be heated by an electric heating element 22. The block 21 is cooled by the ambient atmospheric conditions, including temperature, wind and solar radiation. The block 21 is hollowed out to receive a container 23 in which is mounted a bimetallic element 24 by means of a post 25. The bimetallic element 24 operates contacts 26 and 27 which are adapted to sequentially engage contacts 28 and 29 respectively. The container 23 is provided with a cover 30 so that the bimetallic element 24 responds directly to the temperature of the metallic block 21. The arrangement is such that as the block temperature decreases to 72°, contacts 26 and 28 are made and upon a further decrease in temperature to 68° the contacts 27 and 29 are made. The component parts of the outdoor controller 20 may be housed in a suitable casing 31 to protect the same against the elements.

Line wires leading from some source of power, not shown, are designated at 33 and 34. A primary 35 of a step-down transformer 36 having a secondary 37 is connected across the line wires 33 and 34. A relay coil 38 controls the operation of switch arms 39, 40 and 41 with respect to contacts 42, 43 and 44 respectively. The arrangement is such that when the relay coil 38 is energized the switch arms 39, 40 and 41 are moved into engagement with the contacts 42, 43 and 44 and when the relay coil 38 is deenergized the switch arms are moved out of engagement with their respective contacts by means of springs, gravity or other means, not shown. One end of the secondary 37 is connected by a wire 45 to one end of the relay coil 38. The other end of the secondary 37 is connected by a wire 46 to the contact 28 of the outdoor controller 20. The contact 29 is connected by wire 47 to the other end of the relay coil 38. The bimetallic element 24 is connected by a wire 48 to the contact 42 and the switch arm cooperating therewith is connected by a wire 49 to the junction of wire 47 and the relay coil 38. The contact 43 is connected by a wire 51 to the line wire 34 and the switch arm 40 cooperating therewith is connected by a wire 52, a variable resistance 53 and wire 54 to one end of the electric heating element 22. The other end thereof is connected by a wire 55 to the line wire 33.

As the block temperature decreases to 72° due to the outdoor atmospheric conditions contacts 26 and 28 are made, and when the block temperature decreases to 68° contacts 27 and 29 are made. This completes a circuit from the secondary 37 through wire 46, contacts 28, 26, 27 and 29, wire 47, relay coil 38 and wire 45 back to the secondary 37. Completion of this circuit causes energization of the relay coil 38 to move the switch arms 39, 40 and 41 into engagement with the contacts 42, 43 and 44 respectively. Movement of the switch arm 39 into engagement with the contact 42 completes a maintaining circuit for the relay coil 38 from the secondary 37 through wire 46, contacts 28 and 26, bimetallic element 24, wire 48, contact 42, switch arm 39, wire 49, relay coil 38 and wire 45 back to the secondary 37. Completion of this circuit maintains the relay coil 38 energized until such time as the block temperature shall rise to 72° to break contact between the contacts 26 and 28. Movement of the switch arm 40 into engagement with the contact 43 completes a circuit from the line wire 34 through wire 51, contact 43, switch arm 40, wire 52, variable resistance 53, wire 54, electric heating element 22 and wire 55 back to the line wire 33. Therefore, when the relay coil 38 is energized the electric heating element 22 is energized to cause heating of the block 21 and the amount of heat delivered to the block 21 by the electric heating element 22 is controlled by the variable resistance 53 in circuit therewith. In this manner the block 21 is alternately heated and cooled to maintain the temperature thereof within the limits of 68° to 72°.

This invention contemplates the use of a time switch generally designated at 57. The time switch may comprise a motor rotor 58 operated by a field winding 59 which is connected by wires 60 and 61 across a secondary 62 of a step-down transformer 63 having a primary 64 connected across the line wires 33 and 34. Rotation of the motor rotor 58 is translated through a reduction gear train 65 to operate adjustable cams 66, 67 and 68, the arrangement being such that the cams 66, 67 and 68 make one revolution every 24 hours. Cam 66 operates a switch arm 69 with respect to a contact 70, the cam 67 a switch arm 71 with respect to a contact 72, and the cam 68 a switch arm 73 with respect to a contact 74. The cams 66, 67 and 68 are shaded to designate a. m. and p. m. portions, the p. m. portions being shaded. Since the cams are rotated in the direction indicated by the arrows it is seen that the cams are in a position corresponding to 12:00 midnight. It is seen that the cam 68 will move the switch arm 73 into engagement with the contact 74 at substantially 7:00 a. m. and will move the switch arm 73 out of engagement with the contact 74 at substantially 11:00 p. m. The cam 67 will move the switch arm 71 into engagement with the contact 72 at substantially 5:00 a. m. and out of engagement therewith at 7:00 a. m. The cam 66 will move the switch arm 69 into engagement with the contact 70 at 11:00 p. m. and out of engagement therewith at 5:00 a. m.

The contact 44 associated with the switch arm 41, operated by the relay coil 38, is connected by a wire 77 to the line wire 34 and the switch arm 41 is connected by a wire 78 to the contact 74 of the time switch. The switch arm 73 is connected by wires 79 and 80 to the oil burner 16 which in turn is connected by a wire 81 to the other line wire 33. Assume for the present that the time switch 57 is in position for day operation and that the switch arm 73 is in engagement with the contact 74. Upon a call for heat by the outdoor controller so as to energize the relay coil 38 the switch arm 41 is moved into engagement with the contact 44 to complete a circuit from the line wire 34 through wire 77, contact 44, switch arm 41, wire 78, contact 74, switch arm 73, wires 79 and 80, oil burner 16, and wire 81 back to the line wire 33. Completion of this circuit causes operation of the oil burner 16 and consequent heating of the water in the boiler 15 to supply heat to the spaces 10. In this manner the oil burner 16 is operated simultaneously with the electric heating element 22 by the thermostatic switching mechanism of the outdoor controller 20. By properly adjusting the variable resistance 53 to maintain the heat inputs to the outdoor controller 20 and to the spaces 10 proportional to the heat losses from the outdoor controller 20 and the spaces 10, the building temperature may be maintained constant throughout the day in the manner disclosed in the above referred to Taylor application.

In order to accomplish a variable morning pickup so that the temperature of the building is restored to normal at a given time each morning following a night shutdown, I provide an outdoor controller generally designated at 83. This outdoor controller 83 may comprise a mass in the form of a metallic block 84 which is heated by an electric heating element 85. The metallic block 84 is hollowed out to receive a container 86 in which are mounted two bimetallic elements 87 and 88 by means of posts 89 and 90 respectively. The bimetallic element 87 operates contacts 91 and 92 with respect to stationary contacts 93 and 94. Likewise the bimetallic element 88 operates contacts 95 and 96 with respect to stationary contacts 97 and 98. The container 86 is provided with a cover 99 so that the bimetallic elements 87 and 88 are responsive solely to the temperature of the metallic block 84. The contacts 93 and 94 are so adjusted that when the block temperature decreases to 102° contacts 91 and 93 are made, and when the block temperature decreases to 100° the contacts 93 and 94 are made. The contacts 97 and 98 are so adjusted that when the temperature of the block 84 decreases to 62° the contacts 95 and 97 are made, and when the temperature decreases to 60° the contacts 96 and 98 are made. The component parts of the outdoor controller 83 may be enclosed in a suitable casing 100 to protect the same from the elements.

A relay coil 102 operates switch arms 103 and 104 with respect to contacts 105, 106 and 107. The arrangement is such that when the relay coil 102 is energized the switch arms 103 and 104 are moved into engagement with the contacts 105 and 106 and when the relay coil 103 is deenergized the switch arms 103 and 104 are moved out of engagement with contacts 105 and 106, and the switch arm 104 is moved into engagement with the contact 107 by means of springs, gravity or other means, not shown. A primary 108 of a step-down transformer 109 having a secondary 110 is connected across the line wires 33 and 34. One end of the secondary 110 is connected to one end of the relay coil 102 by a wire 111. The other end of the secondary 110 is connected by a wire 112 to the contact 70 of the time switch 57. The switch arm 69 cooperating with the contact 70 is connected by a wire 113 to the contact 93 of the outdoor controller 83. The contact 94 is connected by a wire 114 to the other end of the relay coil 102. The bimetallic element 87 is connected by a wire 115 to the contact 105 and the switch arm 103 is connected by a wire 116 to the junction of the wire 114 and the relay coil 102. The line wire 34 is connected by a variable resistance 118 and a wire 119 to the contact 106 and the switch arm 104 cooperating therewith is connected by a wire 120 to one end of the electric heating element 85. The other end thereof is connected by a wire 121 to the line wire 33. The line wire 34 is connected by a variable resistance 122 and a wire 123 to the contact 107.

With the time switch 57 in a position corresponding to midnight as shown in the drawing, the switch arm 69 is held in engagement with the contact 70. When the temperature of the block 84 decreases to 100° a circuit is completed from the secondary 110 through wire 112, contact 70, switch arm 69, wire 113, contacts 93, 91, 92 and 94, wire 114, relay coil 102 and wire 111 back to the secondary 110. Completion of this circuit causes energization of the relay coil 102 to move the switch arms 103 and 104 into engagement with the contacts 105 and 106 respectively. Movement of the switch arm 103 into engagement with the contact 105 completes a maintaining circuit for the relay coil 102 from the secondary 110 through wire 112, contact 70, switch arm 69, wire 113, contacts 93 and 91, bimetallic element 87, wire 115, contact 105, switch arm 103, wire 116, relay coil 102 and wire 111 back to the secondary 110. This circuit maintains the relay coil 102 energized until such time as the block temperature shall rise to 102°. Movement of the switch arm 104 into engagement with the contact 106 completes a circuit through the variable resistance 118 to cause energization of the electric heating element 85 to heat the block 84 to restore the temperature of the block to 102°. The variable resistance 118 may be adjusted to vary the rate at which the block 84 is heated. When the temperature of the block 84 reaches 102° the relay coil 102 is deenergized to move the switch arm 104 into engagement with the contact 107. This completes a circuit from the line wire 34 through variable resistance 122, wire 123, contact 107, switch arm 104, wire 120, heating element 85 and wire 121 back to the other line wire 33. The variable resistance 122 is provided in this circuit to supply a small amount of heat to the heating element 85 when the block 84 is being cooled by the outdoor atmospheric conditions. The amount of heat supplied to the heating element 85 through the variable resistance 122 is not sufficient to raise or maintain the temperature of the block 84 but only provides a retarding effect on the cooling of the block 84. When the time switch 57 moves the switch arm 69 out of engagement with the contact 70 the relay coil 102 is deenergized and it is impossible to energize the same even though the bimetallic element 87 of the outdoor controller 83 should be calling for heat. Therefore, when the time switch moves the switch arm 69 out of engagement with the contact 70 the block 84 is allowed to cool down to ambient atmospheric conditions and the rate of cooling of the block 84 is dependent upon outdoor atmospheric conditions, including temperature, wind and solar radiation, and the heating effect of the heater 85 as influenced by the variable resistance 122. For given outdoor atmospheric conditions the rate of cooling of the block 84 may therefore be adjusted by adjustment of the variable resistance 122. It follows, then, that with a given adjustment of the variable resistance 122 the block 84 will cool more rapidly when the outdoor atmospheric conditions are severe and less rapidly when the outdoor atmospheric conditions are mild.

A relay coil 125 operates switch arms 126 and 127 with respect to contacts 128 and 129, the arrangement being such that when the relay coil 125 is energized switch arms 126 and 127 are moved into engagement with the contacts 128 and 129 respectively, and when the relay coil 125 is deenergized the switch arms 126 and 127 are moved out of engagement with their respective contacts by means of springs, gravity or other means, not shown. A primary 130 of a step-down transformer 131 having a secondary 132 is connected across the line wires 33 and 34. One end of the secondary 132 is connected by a wire 133 to one end of the relay coil 125 and the other end of the secondary 132 is connected by a wire 134 to the contact 97 of the outdoor controller 83. Contact 98 is connected by a wire 135 to the other end of the relay coil 125. The bimetallic element 88 is connected by a wire 136 to the contact 128 and the switch arm 126 cooperating therewith is connected by a wire 137 to the junction of wire 135 and the relay coil 125.

When the temperature of the block 84 decreases to 60° the contacts 95, 96, 97 and 98 are made and a circuit is completed from the secondary 132 through wire 134, contacts 97, 95, 96 and 98, wire 135, relay coil 125 and wire 133 back to the secondary 132. Completion of this circuit causes energization of the relay coil 125 to move the switch arms 126 and 127 into engagement with the contacts 128 and 129. Movement of the switch arm 126 into engagement with the contact 128 completes a maintaining circuit for the relay coil 125 from the secondary 132 through wire 134, contacts 97 and 95, bimetallic element 88, wire 136, contact 128, switch arm 126, wire 137, relay coil 125 and wire 133 back to the secondary 132. Completion of this circuit maintains the relay coil 125 energized until such time as the temperature of the block 84 shall rise above 62°.

Line wire 34 is connected by wires 77 and 138 to the contact 72 of the time switch 57. The switch arm 71 cooperating with the contact 72 is connected by a wire 139 to the contact 129, and the switch arm 127 cooperating therewith is connected by wire 140 to the junction of wires 79 and 80. Therefore, when the relay coil 125 is energized and the time switch 57 is in such position as to cause engagement of the switch arm 71 with the contact 72 a circuit is completed from the line wire 34 through wires 77 and 138, contact 72, switch arm 71, wire 139, contact 129, switch arm 127, wires 140 and 80, oil burner 16 and wire 81 back to the other line wire 33, to cause operation of the oil burner 16.

Summarizing the operation of the entire system, it is assumed that the parts are in the position shown in the drawing and that the time switch corresponds to 12:00 midnight. The heater 22 of the outdoor controller 20 is alternately energized and deenergized whereby the temperature of the block 21 of the outdoor controller 20 is maintained within temperature limits of 68° and 72°. Since at 12:00 o'clock the time switch arm 73 is out of engagement with the contact 74 the operation of the outdoor controller 20 does not cause operation of the oil burner 16. Likewise, since the switch 71 is out of engagement with the contact 72 the oil burner 16 cannot be placed in operation independently of the relay controlled by the outdoor controller 20. Therefore, the supply of heat to the building is shut off and the building temperature is allowed to deviate from normal. The switch arm 69 of the time switch 57 is maintained in engagement with the contacts 70, and therefore the heating means 85 of the outdoor controller 83 is alternately energized and deenergized to maintain the temperature of the block 84 of the outdoor controller 83 between the limits of 100° and 102°.

At 5:00 o'clock in the morning the cam 67 of the time switch 57 moves the switch arm 71 into engagement with the contact 72 but the oil burner is not immediately placed in operation since the switch arm 127 is out of engagement with the contact 129 by reason of the temperature of the block 84 being above 60°. Also, at 5:00 o'clock in the morning the switch arm 69 of the time switch 57 is moved out of engagement with the contact 70 to deenergize the relay coil 102 whereby the block 84 of the outdoor controller 83 is allowed to cool, the rate of cooling being dependent upon the adjustment of the variable resistance 122 and upon outdoor atmospheric conditions, including temperature, wind, and solar radiation. When the block 84 of the outdoor controller 83 cools to 60° the relay coil 125 is energized to move the switch arm 127 into engagement with the contact 129 to complete a circuit therethrough and through the switch arm 71 and contact 72 of the time switch 57 to the oil burner 16 to cause operation thereof. Operation of the oil burner 16 in this manner causes continuous supply of heat to the spaces 10 of the building.

At 7:00 o'clock in the morning the switch arm 71 of the time switch 57 is moved out of engagement with the contact 72 to stop continuous operation of the oil burner 16 since at that time the building temperature is restored to normal. Also at 7:00 o'clock in the morning the switch arm 73 is moved into engagement with the contact 74 to place the control of the oil burner 16 under the outdoor controller 20, and in the manner pointed out above, the outdoor controller 20 controls the oil burner 16 to supply sufficient heat to the building to maintain the temperature of the building constant throughout the day.

At 11:00 o'clock in the evening the switch arm 73 of the time switch 57 is moved out of engagement with the contact 74 to take the control of the oil burner 16 away from the outdoor controller 20, whereby the building temperature is allowed to deviate from normal. Also at 11:00 o'clock in the evening the switch arm 69 is moved into engagement with the contact 70 to cause heating of the block 84 of the outdoor controller 83 to substantially 100° and the above cycle of operation is repeated.

From the above description of operation it is seen that the supply of heat to the outdoor controller 83 is decreased at a given time in the morning, 5:00 o'clock as illustrated. When the temperature of the block 84 decreases to a given value, 60° as illustrated, the oil burner 16 is placed in continuous operation. For purposes of illustration it is assumed that continuous operation of the oil burner 16 during the severest weather conditions for an hour and a half will restore the building temperature to normal. Since the time period of the cam 67 is two hours, the variable resistance 122 which regulates the cooling rate of the block 84 is so adjusted that under the severest weather conditions it will take one-half an hour for the block 84 to cool from 100° down to 60°. It follows then that for the two-hour timing period controlled by the cam 67 of the time switch 57, one-half an hour is utilized for cooling the block 84 and one hour and a half of continuous operation of the oil burner 16 is utilized for heating the building. Therefore, the building temperature is restored to normal during this morning pickup cycle. When the outdoor atmospheric conditions are relatively mild, it takes only one-half an hour to heat the building to restore the building temperature to normal, and it takes substantially one hour and a half for the block 84 to cool from 100° to 60° during these mild weather conditions. Therefore, during mild weather conditions the oil burner 16 will be turned on at substantially 6:30 in the morning to restore the building temperature to normal at 7:00 o'clock. For intermediate weather conditions the rate of heating of the building and the rate of cooling of the block 84 will vary inversely with respect to each other. It follows then that the oil burner 16 is placed in continuous operation at a time in the morning which varies in accordance with outdoor atmospheric conditions, so that regardless of the outdoor atmospheric conditions the building temperature is restored to normal at a given time in the morning, illustrated as 7:00 o'clock. Since the outdoor controller 83, performing the variable morning pickup cycle, is subject to the same ambient atmospheric conditions as the building, including temperature, wind, and solar radiation, the building temperature will be restored to normal at a given time each morning regardless of the effects of temperature, wind or solar radiation.

Although I have disclosed my invention as applied to a heating system of the type shown and described in the above referred to Taylor application, it is applicable to other types of heating systems, such as a heating system using the conventional room thermostat. The various timing intervals and temperature values used throughout this specification are so used for purposes of illustration only, since for various installations these timing values and temperature values may be different, and it is within the contemplation of this invention to use such timing and temperature values as will cause the satisfactory operation of the temperature control system. Although for purposes of illustration I have shown one form of my invention, other forms thereof may become obvious to those skilled in the art and consequently this invention is to be limited only by the scope of the appended claims and prior art.

I claim as my invention:

1. In a temperature control system for a building for providing a variable morning pickup following a night shutdown, the combination of heating means for the building, a controller maintained at a predetermined high temperature, time means operative at a given time in the morning to allow the controller to cool, thermostatic means responsive to the temperature of the controller for placing the heating means in operation when the controller temperature decreases to a given value to restore the building temperature to normal, and means for adjusting the rate of cooling of the controller.

2. In a temperature control system for a building for providing a variable morning pickup following a night shutdown, the combination of heating means for the building, a controller outside of the building and subject to the same ambient conditions as the building, said controller including temperature responsive means and heating means to maintain the temperature thereof at a given value above the ambient, time means operable at a given time in the morning to cause cooling of the controller, the thermostatic means being operable at a given temperature of the controller to place the building heating means in operation to restore the building temperature to normal, and means for adjusting the rate of cooling of the controller.

3. In a temperature control system for a building, the combination of heating means for the building, temperature responsive means in control of the heating means to maintain the building temperature at normal during the daytime, a controller outside of the building and subject to the same ambient conditions as the building and including thermostatic means responsive to the temperature thereof and heating means to maintain the temperature thereof at a given value during the night, time means for interrupting the control of the building heating means by the temperature responsive means during the night whereby the building temperature is allowed to deviate from normal and for interrupting the supply of heat to the outdoor controller at a given time in the morning whereby the outdoor controller is allowed to cool, the thermostatic means placing the building heating means in operation when the temperature of the controller decreases to a given value whereby the building temperature is restored to normal, and the time means also placing the building heating means under the control of the temperature responsive means at a subsequent time in the morning whereby the building temperature is maintained at normal.

4. In a temperature control system for a building, the combination of heating means for the building, temperature responsive means in control of the heating means to maintain the building temperature at normal during the daytime, a controller outside of the building and subject to the same ambient conditions as the building and including thermostatic means responsive to the temperature thereof and heating means to maintain the temperature thereof at a given value during the night, time means for interrupting the control of the building heating means by the temperature responsive means during the night whereby the building temperature is allowed to deviate from normal and for interrupting the supply of heat to the outdoor controller at a given time in the morning whereby the outdoor controller is allowed to cool, the thermostatic means placing the building heating means in operation when the temperature of the controller decreases to a given value whereby the building temperature is restored to normal, and the time means also placing the building heating means under the control of the temperature responsive means at a subsequent time in the morning whereby the building temperature is maintained at normal, and means for adjusting the rate of cooling of the controller.

5. In a temperature control system for a building, the combination of heating means for the building, a first controller outside of the building responsive to the same atmospheric conditions as the building including temperature, wind and solar radiation, for controlling the building heating means to maintain the building temperature constant throughout the day, means for interrupting the control of the building heating means by the outdoor controller during the night whereby the building temperature is allowed to deviate from normal, means controlling the building heating means to restore the temperature of the building to normal in the morning, and a second controller outside of the building responsive to the same atmospheric conditions as the building including temperature, wind and solar radiation for determining when the last mentioned means shall control said building heating means to restore the building temperature to normal.

6. In a system of the class described, the combination of a temperature changing means for a building, means for controlling said temperature changing means to maintain a normal temperature within the building, means for controlling the temperature changing means so that the building temperature may deviate from normal, and means for restoring said building temperature to normal, said last mentioned means including a controller influenced by outside weather conditions, a temperature changer for said controller, thermostatic means responsive to the temperature of the controller for controlling said controller temperature changer, timing means for placing said building temperature changer in operation to restore the building temperature to normal, and means influenced by the rate of heat loss from said controller for cooperating with said timing means to determine the time at which said temperature changer is operated to restore the building temperature to normal.

7. In a system of the class described, in combination, a condition changer for a space, a controller outside of said space, a condition changer for said controller, means responsive to the condition of said controller for normally maintaining said controller condition at a predetermined value, means for placing said condition responsive means out of operation to allow said controller condition to vary, and means influenced by the rate of variation in said controller condition for controlling said space condition changer.

8. In a system of the class described, the combination of heating means for a building, means for controlling the heating means to maintain the building temperature normal for a predetermined period and to permit the temperature to deviate from normal at the end of said period, means to control the heating means to cause the temperature to be restored to normal at a predetermined time, said last-mentioned means including an element capable of being heated, means causing said element to be heated to a maximum temperature during the time that the building temperature is permitted to deviate from normal, means decreasing the temperature of said element at a predetermined time, said element being so located and adjusted that its rate of cooling is in direct proportion to the amount of heat necessary to raise the building temperature to normal, and means responsive to the rate of cooling of said element for controlling the heating means and for determining the length of time that the heating means must be operated in order to restore the temperature of the building to normal at the predetermined time.

9. In a system of the class described, the combination of heating means for a building, means for controlling the heating means to maintain the building temperature normal for a predetermined period and to permit the building temperature to deviate from normal at the end of said period, means to control the heating means to cause the temperature to be restored to normal at a predetermined time, said last mentioned means including an element capable of being heated, means for heating said element to a maximum temperature during the time that the temperature is permitted to deviate from normal, said element being subject to outside temperature, wind and solar radiation and so designed that its rate of cooling will be in direct proportion to the amount of heat necessary to raise the building temperature to normal, means to permit the temperature of said element to decrease at a predetermined time, and means for causing operation of the building heating means at a time thereafter which is dependent upon the rate of cooling of the element so that continuous operation of the heating means will cause the temperature of the building to be restored to normal at said predetermined time.

10. In a system of the class described, the combination of heating means for a building, temperature responsive means in control of the heating means to maintain the temperature of the building normal during predetermined periods, means interrupting control over the heating means by said temperature responsive means during other periods whereby the building temperature is allowed to drop below normal, means for causing uninterrupted operation of the heating means at the end of said other periods, and means for determining the time that said uninterrupted operation of the heating means is initiated so that the temperature of the building will be at its normal value at the beginning of said predetermined periods, said last mentioned means including a heat retaining element, means heating said element to a temperature higher than that of the ambient atmosphere during said other periods, means operative to permit the temperature of said element to decrease after a predetermined time interval prior to the expiration of said other periods, said element being so located and adjusted that its rate of cooling is in direct proportion to the heating load on the building, and means responsive to the rate of cooling of the element for initiating operation of said heating means.

11. In a system of the class described, the combination of heating means for a building, temperature responsive means in control of the heating means to maintain the temperature of the building normal during predetermined periods, means interrupting control over the heating means by said temperature responsive means during other periods whereby the building temperature is allowed to drop below normal, means for causing uninterrupted operation of the heating means at the end of said other periods, and means for determining the time that said uninterrupted operation of the heating means is initiated so that the temperature of the building will be at its normal value at the beginning of said predetermined periods, said last mentioned means including a thermostatic means, means for heating said thermostatic means to a predetermined temperature during said other periods, means for decreasing the heating of said thermostatic means at a predetermined time interval prior to the expiration of said other periods, said thermostatic means being so located and adjusted that its rate of cooling is in direct proportion to the heating load on the building, and means operated by said thermostatic means after it has cooled to a predetermined temperature during said other periods for causing continuous operation of said heating means until the expiration of said period.

CHARLES B. SPANGENBERG.